UNITED STATES PATENT OFFICE.

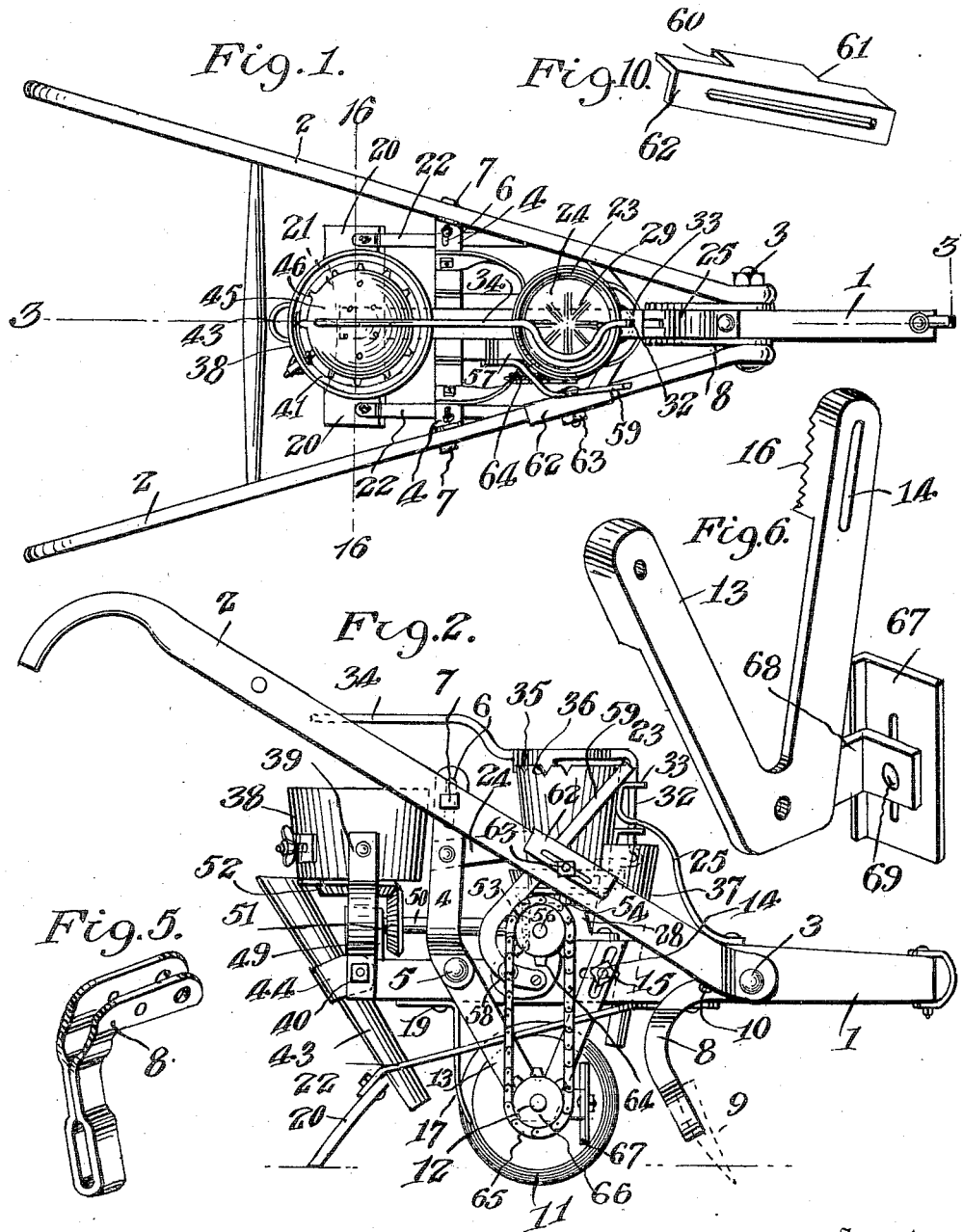

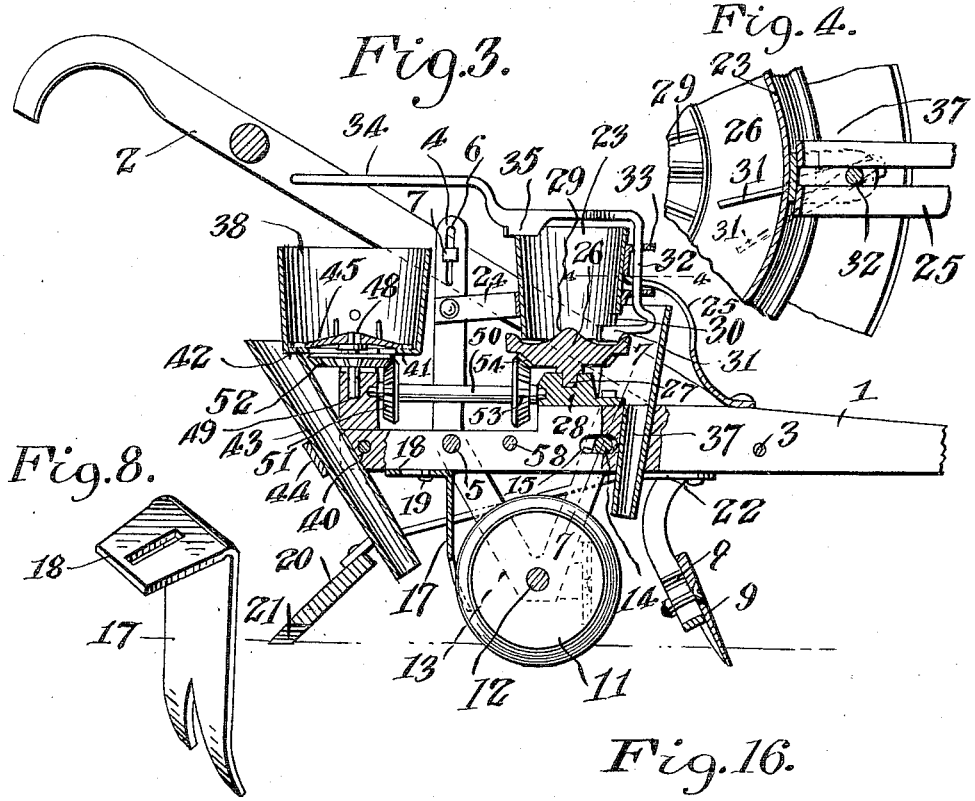
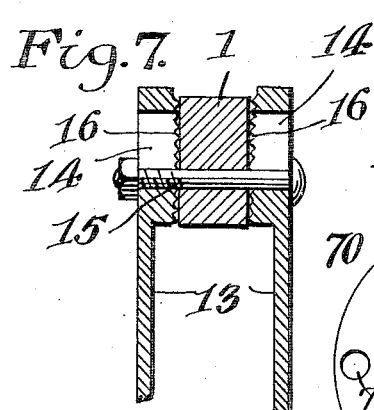
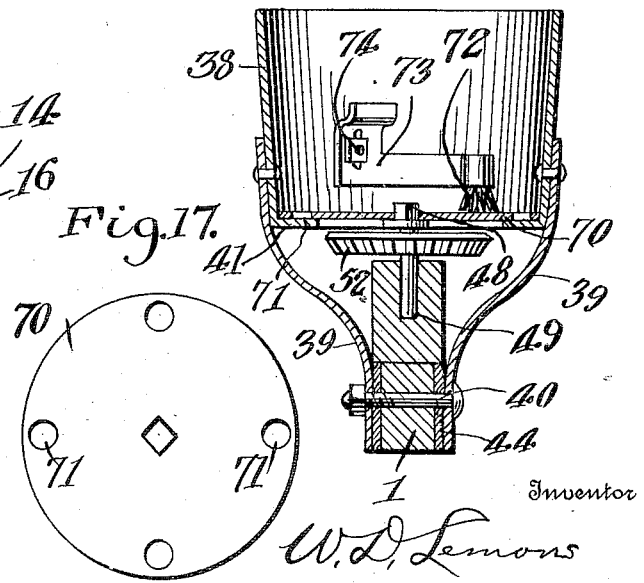

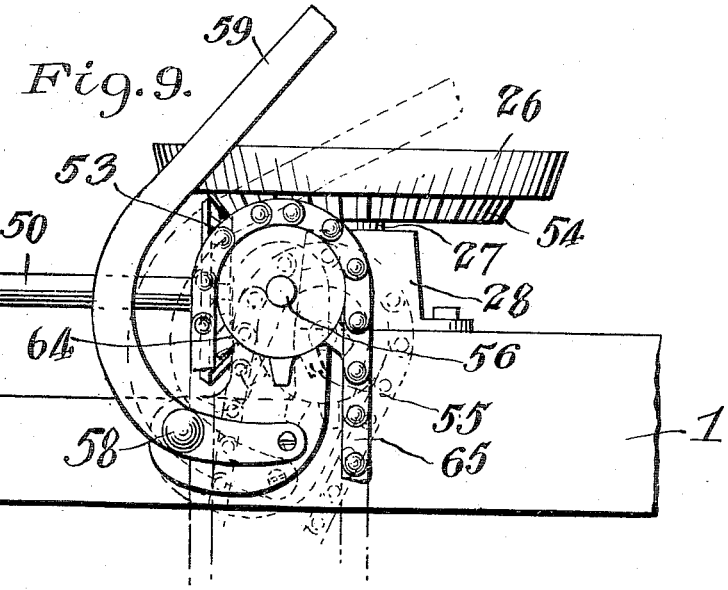
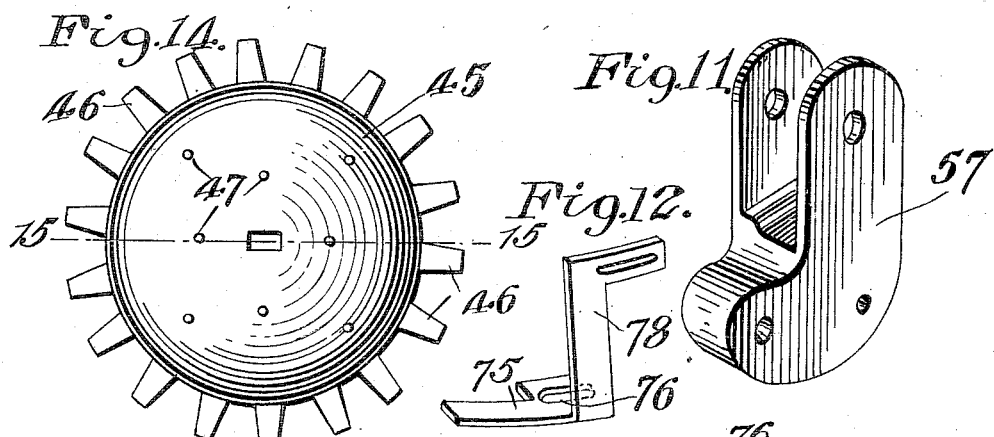
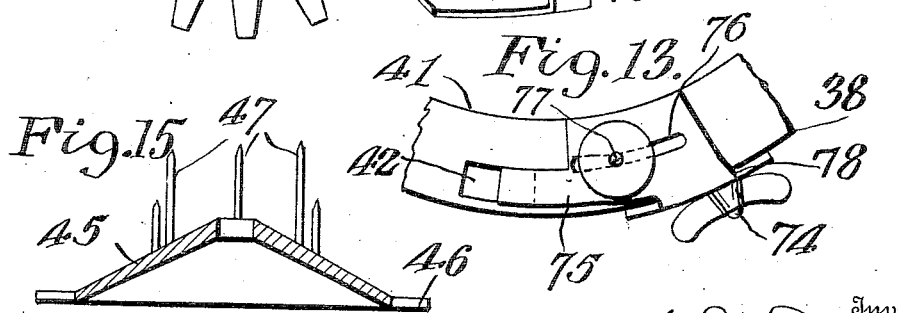

WILLIAM DANIEL LEMONS, OF SHELBY, NORTH CAROLINA, ASSIGNOR OF ONE-HALF TO WILLIAM D. BABINGTON AND THOMAS J. BABINGTON, BOTH OF SHELBY, NORTH CAROLINA.

COMBINED SEED-PLANTER AND FERTILIZER-DISTRIBUTER.

971,856.  Specification of Letters Patent.  Patented Oct. 4, 1910.

Application filed March 16, 1910. Serial No. 549,785.

*To all whom it may concern:*

Be it known that I, WILLIAM D. LEMONS, a citizen of the United States, residing at Shelby, in the county of Cleveland and State of North Carolina, have invented certain new and useful Improvements in Combined Seed-Planters and Fertilizer-Distributers, of which the following is a specification, reference being had to the accompanying drawings.

This invention relates to improvements in combined seed planters and fertilizer distributers and its object is to provide an improved implement of this character which will be simple, strong and durable, and comparatively inexpensive in construction and which may be adapted for a variety of purposes.

With the above and other objects in view, the invention consists of the novel features of construction and the combination and arrangement of parts hereinafter fully described and claimed, and illustrated in the accompanying drawings, in which—

Figure 1 is a plan view of my combined seed planter and fertilizer distributer; Fig. 2 is a side elevation; Fig. 3 is a vertical longitudinal section taken on line 3—3 in Fig. 1; Fig. 4 is a detail section taken on the line 4—4 in Fig. 3; Fig. 5 is a perspective view of the foot or standard for the furrow opening plow; Fig. 6 is a perspective view of one of the brackets for the ground wheel and one of the fenders attached to said bracket; Fig. 7 is a detail section taken on line 7—7 in Fig. 3 and showing the manner in which the ground wheel brackets may be adjusted; Fig. 8 is a perspective view of the mud scraper for the ground wheel; Fig. 9 is a detail view showing the manner in which the gearing between the ground wheel and the fertilizer dropping mechanism is disconnected; Fig. 10 is a detail perspective of the ratchet plate for the gear controlling lever; Fig. 11 is a detail perspective of the bearing member on said lever; Fig. 12 is a detail perspective view showing the slide controlling the outlet opening of the seed hopper; Fig. 13 is a detail view of said slide; Figs. 14 and 15 are respectively top plan and sectional views through the feeding and agitating plate in the seed hopper, the plane of the sectional view, Fig. 15 being indicated by the line 15—15 in Fig. 14; Fig. 16 is a sectional view through the seed hopper taken on the line 16—16 in Fig. 1 but showing it adapted for dropping corn; and Fig. 17 is a plan view of the feed plate for corn shown in Fig. 16.

Referring more particularly to the drawings 1 denotes a beam having at its forward end a suitable clevis to which a draft animal may be connected, and 2 denotes upwardly and rearwardly extending handles spaced apart by a connecting bar and having their forward ends pivotally secured on opposite sides of the intermediate portion of the beam by a transverse pivot bolt 3. Said handles are adjustably supported by upright braces 4 having their lower ends arranged on a transverse pivot bolt 5 in the rear portion of the beam and their upper ends formed with longitudinal slots 6 to receive clamping screws or bolts 7 arranged in said handles.

8 denotes a depending standard or foot to the lower end of which is adjustably secured a furrow opening plow or shovel 9. Said standard 8 is formed from a metal strap bent into the form shown in Fig. 5 so as to provide a slotted lower portion, a contracted intermediate portion and spaced upper end portions secured to the opposite sides of the beam 1 by screws 10 and also by the bolt 3 as shown in Fig. 2. The contracted intermediate portion of the standard 8 permits the earth to readily pass over the top of the shovel 9.

Arranged beneath the beam and in rear of the shovel is a ground wheel 11 preferably provided with a periphery of V-shape in cross section. Said wheel is fixed to a transverse axle or shaft 12 rotatable in V-shaped bearing brackets 13. The upwardly and rearwardly inclined arms of the brackets 13 are pivoted beneath the upright braces 4 by the pivot bolt 5 and the other or forwardly inclined arms of said brackets 13 are formed with longitudinal slots 14 to receive a clamping bolt 15 arranged in the beam. Said slotted ends of the forward arms of the brackets 13 are thickened and have their inner faces toothed or serrated as shown at 16 in Fig. 7 whereby when the bolt 15 is tightened said bracket arms will be securely clamped to the beam 1.

17 denotes a mud scraper of angular formation having a horizontally longitudinally slotted upper portion 18 adjustably secured by a screw or the like 19 to the bottom of the beam 1 and also having a depending forwardly curved resilient portion provided with a V-shaped notch to receive the similarly shaped edge or periphery of the ground wheel 11 as will be readily understood upon reference to Figs. 3 and 8.

Carried by the beam and arranged to travel in rear of the ground wheel is a covering plate or scraper 20. The latter is disposed transversely and inclined downwardly and rearwardly, its lower edge being formed with a centrally arranged concave recess 21 as shown in Fig. 3 whereby a hill is formed at the place where the seed is dropped. Said covering plate 20 is supported by two spring arms 22 the rear ends of which are secured to said plate and the forward ends of which converge and are secured to the bottom of the beam as clearly shown in the drawings.

23 denotes a hopper for fertilizer or the like. This hopper is movably supported by means of rear brackets 24 connected to the upright braces 4 and by means of a front bracket or brackets 25 connected to the forward portion of the beam. The bottom 26 of this hopper is rotatable having at its center a journal 27 which rotates in a bearing 28 secured to the top of the beam 1. The upper face of the hopper bottom 26 has a surrounding flange and at its center is a raised central portion 29 formed with radiating ribs which tend to work the contents of the hopper outwardly toward a discharge opening 30 arranged at the front of the body portion 23 of the hopper and into it projects a deflecting plate 31 on the bent lower end of the vertical shaft or rod 32 rotatable in angular bearing brackets 33 on the front face of the hopper. The upper end of the shaft or rod 32 is bent rearwardly to provide a handle 34 and is also formed with an integral pawl 35 adapted to be sprung into and out of engagement with ratchet notches 36 formed in the upper edge of said hopper as shown more clearly in Fig. 2. It will be seen that when the handle 34 is grasped and lifted, it may be swung laterally to vary the angle of the deflecting plate 31 and consequently control the amount of fertilizer discharged through the opening 30. The fertilizer thus discharged drops into the enlarged funnel-shaped upper end of a spout 37 which latter extends through the beam 1 and drops the fertilizer in rear of the shovel 9.

38 denotes a seed hopper removably arranged above the rear end of the beam and supported by upright brackets 39 rising from the opposite sides of the beam and secured thereto by a transverse bolt 40. The body 38 of the seed hopper has at its lower end an inturned annular flange 41 formed at the rear with a discharge opening 42 arranged above a downwardly and forwardly inclined spout or conductor 43. The latter discharges grain in rear of the ground wheel 11 and is secured by a U-shaped strap or bracket 44 which latter is fastened to the end of the beam by the bolt 40. The hopper 38 is adapted to receive different kinds of seed dropping plates according to the character of the seed to be planted, but as illustrated in Figs. 1 and 3, the plate 45 is adapted to feed cotton seed, oats, peas, or the like, and is substantially cone-shaped. Around its edge are radiating agitating feeding fingers 36 which work the seed toward the discharge opening 42 and rising from the top of said plate are agitator pins 47, as shown more clearly in Figs. 14 and 15. The bottom plate 45 has at its center a rectangular opening to receive the similarly shaped upper end of a vertical shaft 48 rotatable in a bearing 49 secured to the rear portion of the beam.

The gearing for rotating the bottom plates of the fertilizer and seed hoppers comprises a longitudinal shaft 50 having its ends journaled in the bearings 28, 49. On the rear portion of the shaft 50 is a bevel gear 51 which meshes with a similar gear 52 on the shaft 48, and on the forward portion of the shaft 50 is a bevel gear 53 which meshes with the bevel gear 54 formed integral with the bottom plate 26. Also meshing with the gear 53, and movable into and out of mesh with the same is a bevel gear 55 fixed to the inner end of a transverse shaft 56 journaled in the forked portion of the bearing member or plate 57. The latter is pivoted at 58 to the beam 1 and has fixed to it an upwardly projecting hand lever 59 by means of which it may be rocked to move the gear 55 into and out of engagement with the gear 53. Said lever 59 is adapted to engage either of two ratchet shoulders 60, 61, formed upon an angular plate 62 slotted to receive a clamping bolt 63 by means of which it is adjustably secured to one of the handles 2. Upon the outer end of the shaft 56 is fixed a sprocket wheel 64 which is connected by a sprocket chain 65 to a sprocket wheel 66 on one end of the axle 12 of the ground wheel. Owing to this gearing it will be seen that when the implement is pulled forwardly the motion of the ground wheel will be imparted to the fertilizer and seed dropping mechanisms.

67 denotes a guard or deflector plate for keeping dirt off of the sprocket chain 65 and away from the bearings of the axle 12. The guard 67 is in the form of an angular plate disposed in upright position and vertically adjustable on an angular bracket 68 projecting forwardly from the lower end of the bracket 13. The adjustment of the guard plate 67 is preferably effected by forming in the latter vertical slots to receive clamping bolts 69 as will be understood on reference to Fig. 6.

When the implement is to be used for dropping corn or other seed in hills, the dropping plate 70 shown in Figs. 16 and 17 is substituted for the dropping plate 45 in the seed hopper 38. Said dropping plate 70 is of flat circular form and has at its center a squared opening to receive the squared upper end of the shaft 48. At one or more points around the plate 70 adjacent its edge are openings 71 adapted to pass over the discharge or outlet opening 42 for the hopper and permit a few kernels of grain or seed to drop into the spout 43. When the plate 70 is used I also arrange in the hopper 38 a brush 72 carried by one end of an angular attaching plate or bracket 73 which is adjustably secured at 74 and has at its upper end an offset portion forming a finger piece.

The outlet or discharge opening 42 for the seed hopper is adapted to be controlled by a sliding gate 75 which is of angular shape as shown in Fig. 12. The slotted bottom portion 76 of the slide 75 is guided by a pin 77 in the bottom flange 41 of the hopper 38 and the upright slotted portion 78 of said slide may be adjustably secured by a bolt to the outer face of the wall of said hopper. I preferably employ the bolt for securing the end 78 of the slide in adjusted position.

From the foregoing description taken in connection with the accompanying drawings, it is thought that the construction, operation and advantages of the invention will be readily understood. It will be noted, however, that the peculiar construction of the device renders it simple, strong and durable, and comparatively inexpensive and furthermore enables it to be used for a variety of purposes. When the parts are arranged as shown in Figs. 1, 2, 3, of the drawings the device is adapted for dropping both fertilizer and seeds such as cotton seed, grain, etc. By substituting different kinds of seed dropping plates, other kinds of seed or grain may be planted. By removing the seed dropping mechanism and hopper and providing a proper plow on the standard 8 the device may be used as a cultivator and fertilizer distributer.

Various changes in the form, proportion and arrangement of parts may be made within the spirit and scope of the invention.

Having thus described the invention, what is claimed is:

1. In an implement of the character described, the combination of a beam, front and rear bearings upon the same, a longitudinal shaft arranged between said bearings and having its ends rotatable therein, fertilizer and seed hoppers supported above said bearings, rotary fertilizer and seed dropping plates, gears on said longitudinal shaft and meshing with the first mentioned gears, a ground wheel, a swinging bearing pivoted on one side of said beam, a transverse shaft journaled in said swinging bearing, a gear on the inner end of said transverse shaft to mesh with one of the gears on said longitudinal shaft, a hand lever connected to said swinging bearing, a locking means for said hand lever, and sprocket chain gearing between the ground wheel and said transverse shaft.

2. In an implement of the character described, the combination of a beam formed intermediate its ends with a longitudinal slot, a pair of V-shaped hangers arranged on opposite sides of said beam, and each having one arm pivoted to the beam, and its other arm formed with a longitudinal slot to intersect the longitudinal slot in said beam, the last mentioned arms being also formed on their inner faces with inwardly projecting teeth to engage the side faces of the beam, a transverse clamping bolt passed through the slots in said hangers and beam, a ground wheel journaled in the lower portions of said hangers, an adjustable bearing carried by said beam, a shaft in the last mentioned bearing, a sprocket chain gearing between said shaft and the ground wheel, and a dropping mechanism actuated from said shaft.

3. In an implement of the character described, the combination of a beam, hangers depending from the opposite sides of the same, a transverse shaft journaled in the lower ends of said hangers, a ground wheel fixed to the central portion of said shaft, a shovel carrying standard depending from the beam in advance of the ground wheel, a dropping mechanism carried by the beam, a shaft for said mechanism, a sprocket chain gearing between the last mentioned shaft and the shaft of the ground wheel, angle brackets projecting forwardly from the lower portions of said hangers, and a vertically disposed guard plate adjustably mounted on said angle brackets, and arranged adjacent to the ground wheels, and in front of the ground wheel shaft, and its bearings whereby said plate will prevent earth from being thrown against said parts and said sprocket chain gearing.

In testimony whereof I hereunto affix my signature in the presence of two witnesses.

WILLIAM DANIEL LEMONS.

Witnesses:
WM. LINEBERGER,
FORREST ESKRIDGE.